United States Patent [19]

Kimber et al.

[11] Patent Number: 4,457,041
[45] Date of Patent: Jul. 3, 1984

[54] RETAINING SYSTEMS FOR SQUEEGEE ASSEMBLIES IN WINDSHIELD

[75] Inventors: Edward G. Kimber, Carlisle; Peter C. Norris, Oakville, both of Canada

[73] Assignee: Tridon Limited, Hamilton, Canada

[21] Appl. No.: 407,854

[22] Filed: Aug. 13, 1982

[51] Int. Cl.³ .................................................. B60S 1/02
[52] U.S. Cl. .................................................. 15/250.42
[58] Field of Search ......................... 15/250.32–250.42

[56] References Cited

U.S. PATENT DOCUMENTS

| 2,924,839 | 2/1960 | Anderson | 15/250.42 |
| 3,103,687 | 9/1963 | Golub et al. | 15/250.42 |
| 3,619,556 | 11/1971 | Deibel | 15/250.42 |
| 3,707,741 | 1/1973 | Roberts | 15/250.42 |
| 3,757,377 | 9/1973 | Hayhurst | 15/250.32 |

FOREIGN PATENT DOCUMENTS

| 247103 | 9/1963 | Australia | 15/250.42 |
| 2400574 | 7/1974 | Fed. Rep. of Germany | 15/250.42 |
| 2350302 | 4/1975 | Fed. Rep. of Germany | 15/250.42 |
| 1221298 | 2/1971 | United Kingdom | 15/250.42 |

Primary Examiner—Peter Feldman
Attorney, Agent, or Firm—Hirons, Rogers & Scott

[57] ABSTRACT

A windshield wiper comprises a pressure-applying superstructure and a squeegee assembly releasably mounted on the superstructure to permit replacement of the squeegee when worn. Releasable retaining means comprise a projection on one of the superstructure yokes adjacent to an endmost pair of the claws thereof that retain the squeegee assembly and a cooperating recess on the backing member of the squeegee assembly. The retaining means thus uses the flexibility of the backing member to provide the necessary retention. The projection may have a ramp shape to facilitate the latching action as the squeegee assembly is mounted. The invention is applied to a wiper structure for winter conditions in which the superstructure and backing member are completely enclosed by a thin flexible enclosure against the entry of ice and snow, the retaining means being surrounded by an integral shroud that serves as an end closure for the respective end of the flexible enclosure, such a construction requiring also a separate shrouded end clip of comparable structure to the retaining means to close the other end of the flexible enclosure.

3 Claims, 10 Drawing Figures

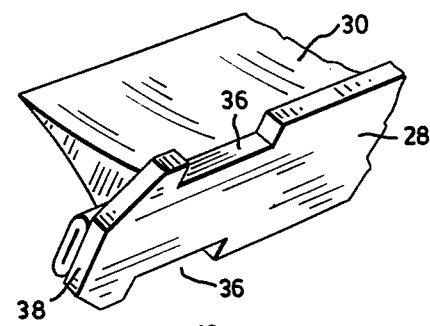
FIG. 10
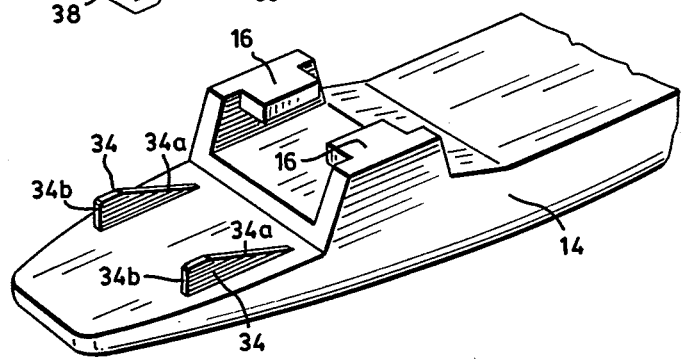
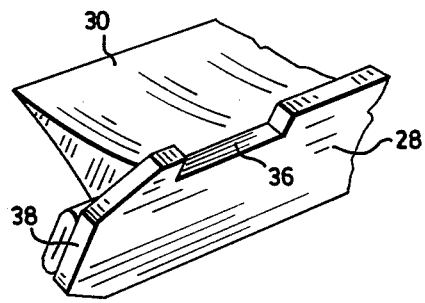
FIG. 9
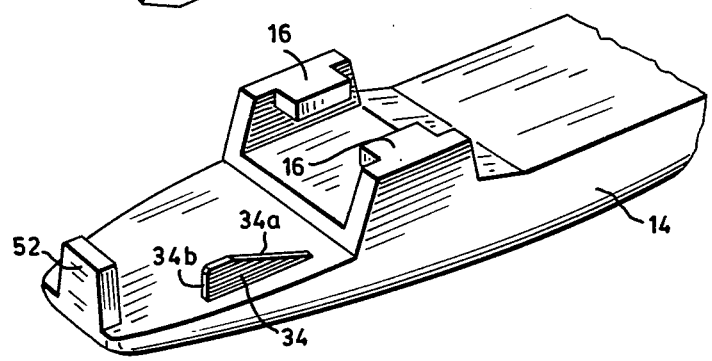

RETAINING SYSTEMS FOR SQUEEGEE ASSEMBLIES IN WINDSHIELD

FIELD OF THE INVENTION

The present invention is concerned with improvements in or relating to windshield wipers and especially to improvements in or relating to retaining systems therein for releasably retaining a squeegee assembly on a superstructure thereof.

REVIEW OF THE PRIOR ART

The design and construction of automobile windshield wipers has become relatively standardised so far as the major parts thereof are concerned. Thus, almost universally they consist of a pressure-applying superstructure connected at its centre to a motor-operated wiper arm, and a squeegee assembly releasably mounted on the superstructure so as to be pressed thereby into contact with the surface being wiped with as uniform pressure as possible along its length, despite changes in contour of the windshield surface due to its curvature. The squeegee assembly almost universally consists of an elongated soft rubber squeegee having a bead portion thereof engaged in a keyhole-type slot in a backing member of relatively rigid material, such as metal or a stiff plastic material, the backing member being thin enough to flex with the squeegee toward and away from the windshield as the squeegee maintains wiping contact, but being wider and much stiffer parallel to the windshield so as to support the squeegee in this direction. The squeegee is of course the fastest-wearing part of the device and it is normal to replace the complete squeegee assembly when the squeegee becomes worn.

There is therefore a need to provide some means as simply and inexpensively as possible for releasably retaining the squeegee assembly on the superstructure. Preferably, this retaining means should be formable as part of the existing components, so that they can be manufactured therewith, usually by moulding from plastic material, without the need for additional parts which unavoidably add to the manufacturing expense. Also the retaining means, while providing positive retention under normal operating conditions, should be engagable and disengagable easily and without the use of tools. The provision of such retaining means is especially difficult with windshield wipers intended for snow and ice conditions, when the entire superstructure is enclosed in a thin flexible enclosure member.

DEFINITION OF THE INVENTION

It is therefore the principal object of the invention to provide a retaining system of the kind specified having these preferred characteristics.

In accordance with the present invention there is provided a windshield wiper comprising:

an elongated pressure-applying superstructure for connection to a wiper arm, an elongated squeegee assembly releasably mounted on the said superstructure, and retaining means for releasably retaining the squeegee assembly mounted on the superstructure, the superstructure having thereon a plurality of longitudinally-spaced opposed pairs of claws embracing cooperating side edges of the squeegee assembly to mount the squeegee assembly on the superstructure, the squeegee assembly comprising a backing member, the side edges of which are embraced by the said opposed pairs of claws to mount the squeegee assembly on the superstructure, and a squeegee mounted on the backing member, the squeegee assembly being mounted in the superstructure claws, and dismounted therefrom, by longitudinal movement of the squeegee assembly respectively in and out of the said claws, said retaining means comprising a projection from the undersurface of the superstructure at one end thereof adjacent to an endmost opposed pair of the claws and a cooperating registering recess in the upper surface of the backing member in which the projection engages to retain the squeegee assembly against said longitudinal movement, the distance between the recess and the said endmost claws being sufficient to permit flexing of the backing member by an operator for disengagement of the projection from the recess, the superstructure having at the said one end a downwardly-extending shroud portion surrounding the said projection and the adjacent backing member side edges and respective end edge, the windshield wiper also comprising a thin flexible enclosure member enclosing the superstructure and the backing member against entry therein of snow and ice, the respective end of the flexible enclosure member surrounding the said shroud portion of the superstructure, the end wall of the shroud portion constituting an end closure for the respective end of the flexible enclosure member, and removable end closure means for the other end of the flexible enclosure member, the removable closure means being surrounded by the said other end of the flexible enclosure member, embracing the respective end of the backing member, having therein a pair of opposed claws for engagement with the respective other end of the backing member and having retaining means comprising a retaining projection in the under face thereof engaging in a recess in the upper face of the backing member at the respective other end thereof to retain the removable end closure member on the backing member.

DESCRIPTION OF THE DRAWINGS

Windshield wipers which are particular preferred embodiments of the invention will now be described, by way of example, with reference to the accompanying diagrammatic drawings wherein:

FIGS. 9 and 10 are respective perspective views, similar to FIG. 2 and of the corresponding end of the respective wiper in order to illustrate two further embodiments of the invention.

Parts of the structures are shown broken away or in outline wherever necessary for clarity of illustration. Similar parts in all the embodiments are given the same reference number.

DESCRIPTION OF THE PREFERRED EMBODIMENTS

Figure 1:
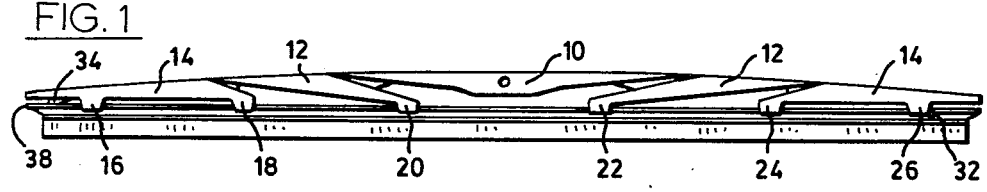
FIG. 1 is a side elevation view of a first structure.
Figure 2:
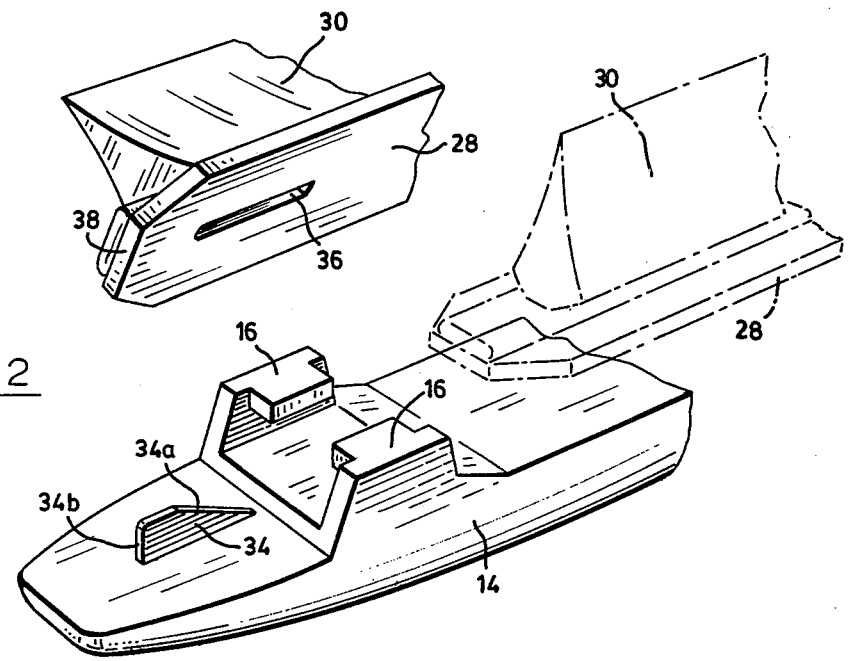
FIG. 2 is a perspective view from above and drawn to a larger scale of one of the two ends of the structure of FIG. 1 to show details of the construction thereof.
Figure 3:
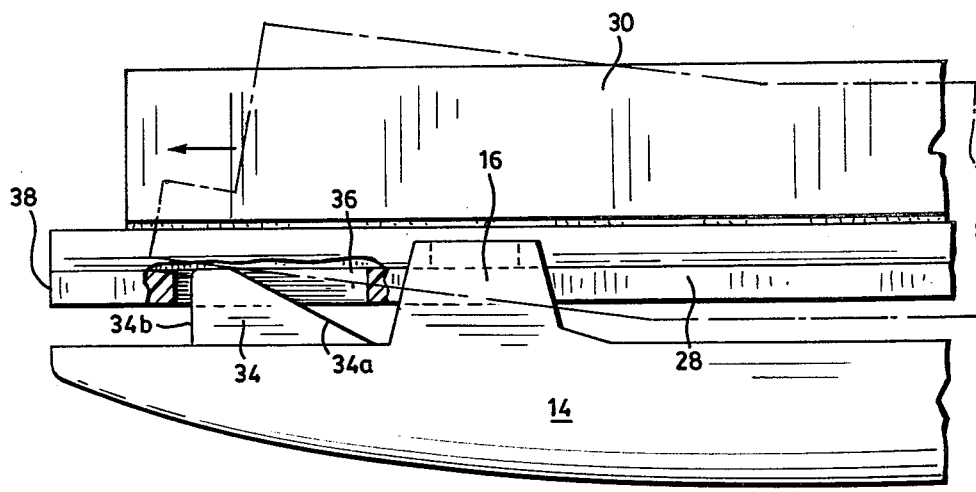
FIG. 3 is a side elevation of the end shown in FIG. 1 with part thereof shown broken away.

All of the structures described have a pressure-applying elongated superstructure adapted to be connected in any suitable manner to a wiper arm (not shown) by which the wiper is moved over the surface to be wiped, the superstructure comprising a central primary yoke 10 to the centre of which the wiper arm is attached, two secondary yokes 12 respectively pivotally connected intermediate their ends to the two ends of the primary yoke 10, and two tertiary yokes 14 respectively pivotally connected intermediate their ends to the outer ends of the two secondary yokes 12. Such a superstructure operates in known manner to distribute the pressure applied by the wiper arm to the squeegee relatively uniformly over the length of the wiper despite changes in the curvature of the surface over which it is moved.

The inner ends of the two secondary yokes, and both ends of the two tertiary yokes, are provided with opposed pairs of claws 16, 18, 20, 22, 24 and 26 which in known manner embrace the transversely-extending longitudinal edges of an elongated backing member 28 on the under face of which is mounted in any suitable manner an elongated soft rubber squeegee 30. In known manner the backing member preferably is made of relatively stiff plastic material, but is sufficiently thin to be able to flex with the superstructure and the squeegee to the required amount toward and away from the surface to be wiped, while it is quite wide in the transverse direction, sufficiently so to be able to provide the necessary support for the squeegee and remain securely within the embrace of the pairs of retaining claws.

The squeegee assembly is constituted by the assembled backing member and squeegee and is mounted on the superstructure by threading it though the longitudinally-spaced opposed pairs of claws. The invention provides simple and effective retaining means for retaining the squeegee assembly against endwise movement in the superstructure once it has been mounted therein. These retaining means are engaged automatically simply by the above-described threading operation and remain engaged until the operator takes a positive step for its disengagement, e.g. to replace a worn squeegee. To this end the trailing end of the backing member (as it is inserted in the claws) is provided, as for example by an upsetting operation, with two downwardly-extending projections 32 which eventually engage the endmost pair of claws 26, whereupon further endwise mounting movement is positively stopped. It will be noted that the claws 26 are spaced a small distance from the respective outer end of the tertiary yoke 14 and the projections are spaced the same amount from the end of the backing member, so that the end tip portions of the yoke and the backing member are opposite one another.

Similarly the claws 16 at the other end of the superstructure are spaced the same distance from the end of the tertiary yoke 14, and the resultant overhanging yoke end is provided with a downwardly-extending rigid projection 34 that when the squeegee assembly is fully mounted engages in a recess 36 in the upper face of the backing member. The projection 34 is elongated in the direction of movement of the squeegee assembly in the claws, and the face 34a thereof that is contacted by the leading edge 38 of the backing member has the form of a downwardly-inclined ramp facilitating the downward deflection of the backing member necessary for its leading portion to pass over the projection. The other face 34b is perpendicular and engages its respective wall of the recess (which in this embodiment is a slot extending through the backing member) to prevent any withdrawal of the squeegee assembly unless the operator positively deflects the backing member downward sufficiently for the projection to be clear of the recess.

Advantage is thus taken of the necessary relative flexibility of the backing member in the direction perpendicular to the wiped surface to provide the resilient spring whereby the retaining means are held engaged until positively disengaged. This also means that the projection can be completely rigid, and consequently that no compromise is required in the characteristics of the material used to mould the superstructure yokes, which would be the case if flexing was required for the projection and/or the part of the yoke. It will be seen that no tools are required either to mount or dismount the squeegee assembly. Moreover, all of the parts of the retaining means can be manufactured intrinsically as parts respectively of the superstructure and the backing member, so that a separate component or separate manufacturing operation are not required.

Figure 4:
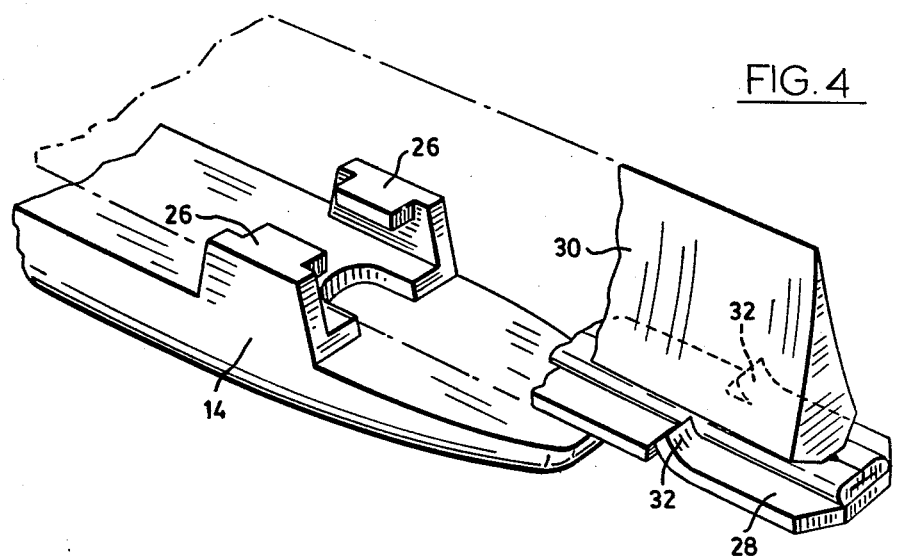
FIG. 4 is a perspective view similar to FIG. 2 of the other end of the structure.
Figure 5:
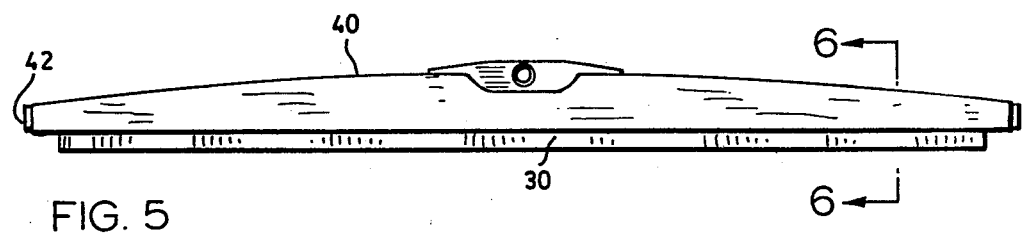
FIG. 5 is a view similar to FIG. 1 of an embodiment of the invention, which is of the type especially suited for use with an enclosing boot or sheath for protection of the wiper against the effects of the deposit of snow and ice thereon.
Figure 6:
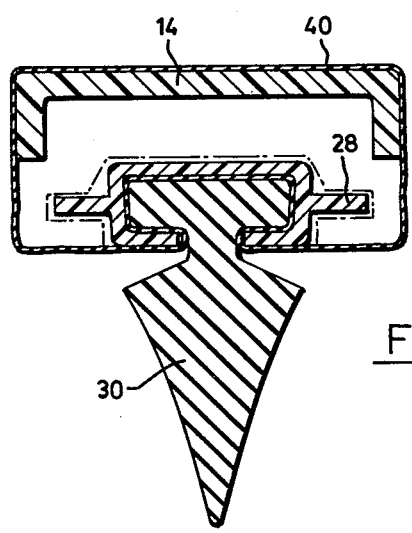
FIG. 6 is a section taken on the line 6—6 of FIG. 5.
Figure 7:
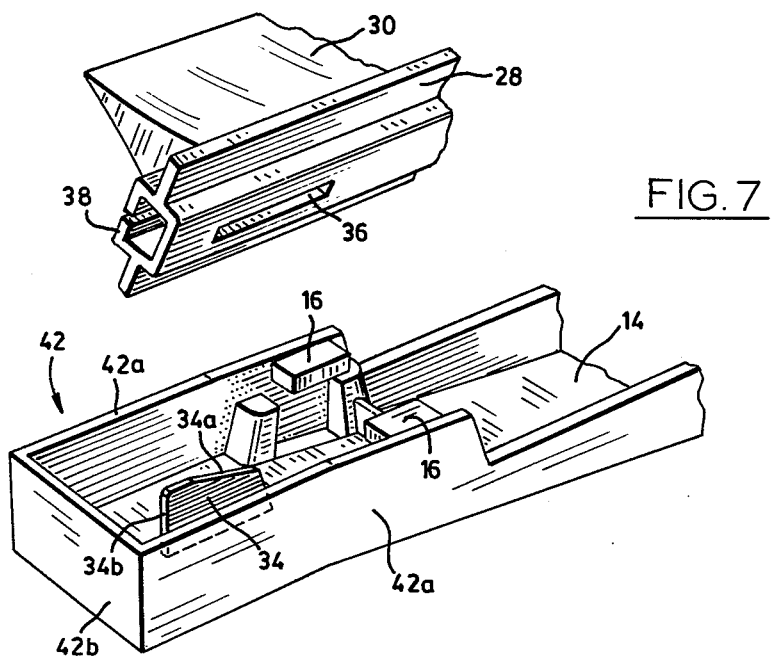
FIGS. 7 and 8 are views similar to FIGS. 2 and 4 respectively and of the embodiment.
Figure 8:
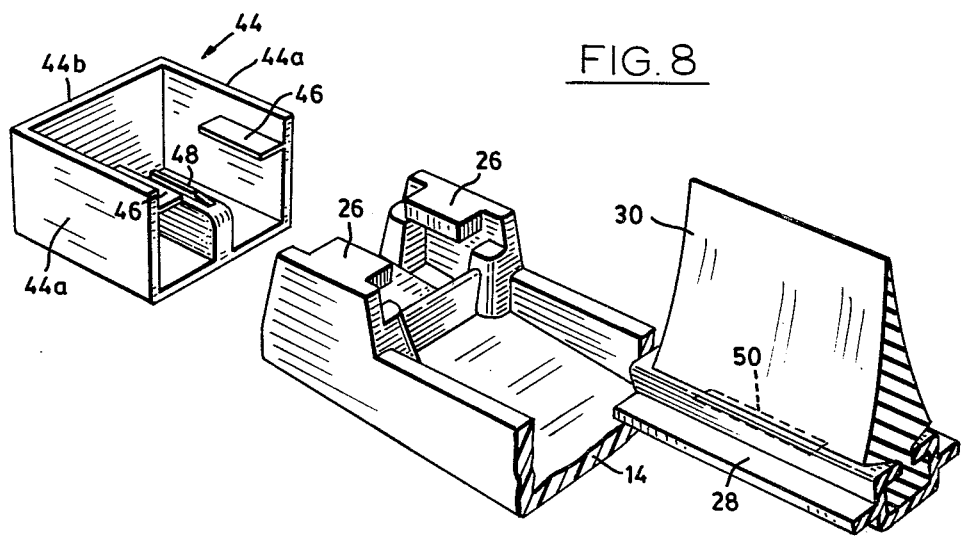

FIGS. 4 to 6 show an embodiment of the invention comprising a windshield wiper of the type in which the superstructure and the backing member are completely enclosed in a flexible rubber sheath or enclosure member 40 (sometimes called a "boot"), which permits these components to flex freely while preventing the entry therein of snow and ice which can otherwise build up to the extent that the wiper is completely disabled. The enclosure is secured on the wiper in known manner by its entrapment between the squeegee member and the walls of the slot of the backing member in which the squeegee is inserted. The end portion of the tertiary yoke 14 carrying the claws 16 is formed with a downwardly-extending shroud portion 42 constituted by two parallel downwardly-extending side walls 42a and an end wall 42b, and the incident end of the enclosure is shaped to fit closely around this shroud portion with only the end wall 42b showing. The end wall 42b therefore forms a further positive stop for endwise movement of the squeegee assembly, but again the retainer means can be formed as the yoke and the backing member are formed without an additional manufacturing operation.

It is not possible to provide a corresponding integral shroud at the other end of the wiper, and instead a separate removable shroud member 44 is used, the adjacent end of the tertiary yoke 14 being cut short. The removable shroud member comprises a pair of embracing claws 46 corresponding to the claws 26, side walls 44a and end wall 44b corresponding to side walls 42a and end wall 42b respectively, ramp shaped downwardly-extending projection 48 corresponding to projection 34 and slot recess 50 in the backing member corresponding to the slot recess 36. The shroud member is inserted into the open end of the enclosure member 40 and moved along the backing member until the projection 48 is engaged in the recess 50.

In the embodiment illustrated by FIG. 9 the downward projection 34 of the retaining means is provided to one edge of the yoke member end instead of centrally as with the two first-described embodiments. The recess 36 in this embodiment consists of a notch formed in the corresponding edge of the backing member.

This embodiment also comprises an additional end stop 52 corresponding in function to the projections 32 of the first structure, and the end wall 42b of the embodiment. In the embodiment illustrated by FIG. 10 two spaced parallel projections 34 are employed cooperating with two spaced notches 36 in the respective edges of the backing member.

It will be seen that the retaining means of the invention can be provided at both ends of the wiper, each retaining means being operative to stop movement in the respective direction. This may be preferred to reliance upon a single retaining means, since the endwise movements then are both blocked by positive engagement with vertical faces of the projection; the sloping ramp face 34a will oppose the respective endwise movement, but of course cannot be as positive as a vertical face. The additional stop 52 and its equivalents are of course completely positive.

We claim:

1. A windshield wiper comprising:
    an elongated pressure-applying superstructure for connection to a wiper arm,
    an elongated squeegee assembly releasably mounted on the said superstructure, and
    retaining means for releasably retaining the squeegee assembly mounted on the superstructure,
    the superstructure having thereon a plurality of longitudinally-spaced opposed pairs of claws embracing cooperating side edges of the squeegee assembly to mount the squeegee assembly on the superstructure,
    the squeegee assembly comprising a backing member, the side edges of which are embraced by the said opposed pairs of claws to mount the squeegee assembly on the superstructure, and a squeegee mounted on the backing member,
    the squeegee assembly being mounted in the superstructure claws, and dismounted therefrom, by longitudinal movement of the squeegee assembly respectively in and out of the said claws,
    said retaining means comprising a projection from the undersurface of the superstructure at one end thereof adjacent to an endmost opposed pair of the claws and a cooperating registering recess in the upper surface of the backing member in which the projection engages to retain the squeegee assembly against said longitudinal movement, the distance between the recess and the said endmost claws being sufficient to permit flexing of the backing member by an operator for disengagement of the projection from the recess,
    the superstructure having at the said one end a downwardly-extending shroud portion surrounding the said projection and the adjacent backing member side edges and respective end edge,
    the windshield wiper also comprising a thin flexible enclosure member enclosing the superstructure and the backing member against entry therein of snow and ice, the respective end of the flexible enclosure member surrounding the said shroud portion of the superstructure, the end wall of the shroud portion constituting an end closure for the respective end of the flexible enclosure member, and
    removable end closure means for the other end of the flexible enclosure member, the removable closure means being surrounded by the said other end of the flexible enclosure member, embracing the respective end of the backing member, having therein a pair of opposed claws for engagement with the respective other end of the backing member and having retaining means comprising a retaining projection in the under face thereof engaging in a recess in the upper face of the backing member at the respective other end thereof to retain the removable end closure member on the backing member.

2. A windshield wiper as claimed in claim 1, wherein projections and cooperating registering recesses are provided at both ends respectively of the superstructure and the backing member.

3. A windshield wiper as claimed in claim 1 or 2, including at least one retaining means comprising two transversely spaced projections at the respective end of the superstructure engagable in two cooperating recesses comprising notches in the edges of the backing member.

* * * * *